Dec. 17, 1957  B. L. LEVINSON  2,816,378
ILLUMINATED DISPLAY DEVICE

Filed Dec. 2, 1953  2 Sheets-Sheet 1

*INVENTOR.*
BENJAMIN L. LEVINSON
BY
James and Franklin
ATTORNEY

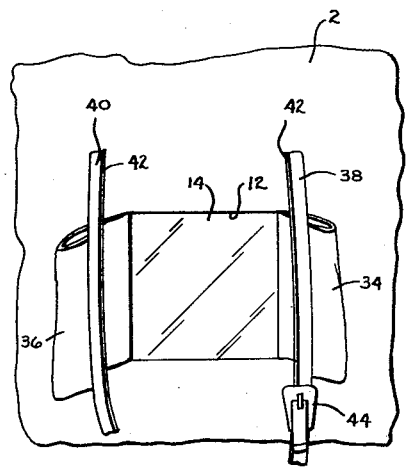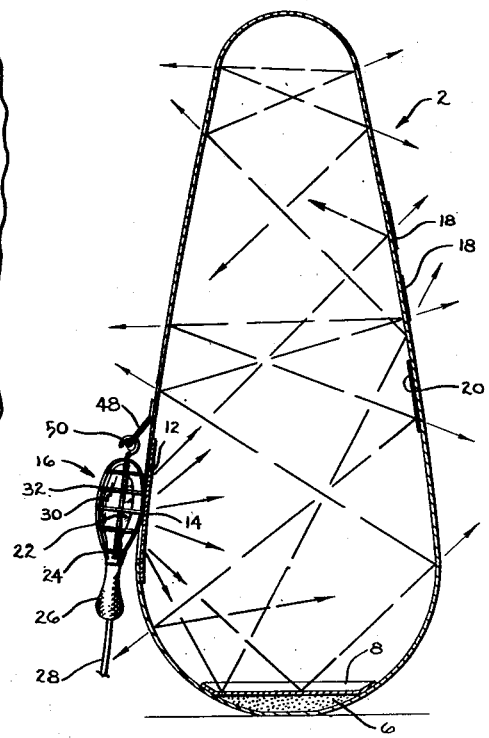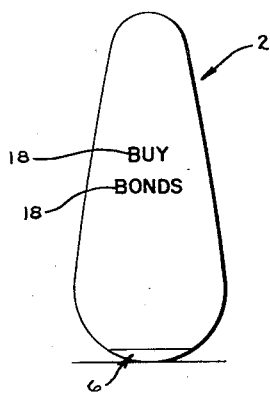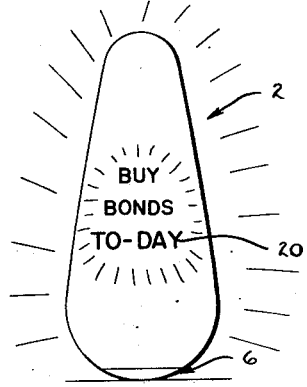

United States Patent Office 2,816,378
Patented Dec. 17, 1957

2,816,378

ILLUMINATED DISPLAY DEVICE

Benjamin L. Levinson, New York, N. Y., assignor to Royal Electric Company, Inc., Westerly, R. I., a corporation of Rhode Island Application December 2, 1953, Serial No. 395,732

4 Claims. (Cl. 40—130)

The present invention relates to an illuminated display device, and in particular to the use of a source of illumination mounted on or adjacent to the exterior of an inflated flexible sheet structure, by means of which the structure is illuminated so as to give the visual impression that the source of illumination is in the interior thereof and uniformly distributed therethrough.

Inflated structures of flexible sheet material, usually of the self-erecting type as shown in Gilman Patent No. 2,449,935, are in widespread use as toys and as display devices. They are usually formed of flexible plastic sheets heat-sealed together so that the structure, when inflated, will hold its shape. The sheeting which defines the body of such structures is usually pigmented so as to be substantially opaque. The degree of opacity may vary, but it is generally sufficiently great so that light of ordinary intensity will not pass therethrough to any appreciable degree. As a result the interior of the structure is not visible at all. Various decorative designs are applied to the exterior of these devices, usually by silk screen printing, in order to render them attractive or to permit them to exhibit desired intelligence, either in the form of advertising or otherwise. A primary advantage of these devices is their simplicity of structure and consequently their inexpensiveness of manufacture.

I have discovered that devices of this general character can very advantageously be employed as illuminated display devices, and that this can be accomplished without destroying the utility of the device in its unilluminated form either as a toy or as a daytime display device, and without detracting from its simplicity and inexpensiveness of construction. More specifically, I have found that when a concentrated source of illumination, such as a light bulb, is positioned on the exterior of the body of such a device, that the light therefrom which passes through a wall of the device into the hollow interior thereof is so distributed therethrough that when the device is viewed from the exterior there is no apparent concentration of light at any one point, the device appearing to be uniformly internally illuminated. I prefer, in order to intensify this effect, to make that portion of the body wall immediately opposite the source of illumination of some material which has a considerably greater light transmissive property than the remainder of the body wall. Thus practically all of the light emanating from the source will enter the interior of the structure, will be there uniformly distributed, and will pass outwardly through the substantially opaque structural walls to create a vary striking visual effect. The most surprising fact is that even when the wall portion next to the light source is practically transparent no concentration of illumination which might give a clue to the precise location of the source of illumination is visible from the exterior of the device.

Because the source of illumination is positioned on the exterior of the structure, it may readily be made removable therefrom, and the structure may therefore be employed, without the light source, in entirely conventional manner, the light source being securable thereto at any time in order to produce an illuminated device as above described. By placing the light source on the exterior of the device the problems inherent in sealing the entry of wires to an internal source are avoided. Because the light source is on the exterior of the device it is readily accessible and hence may be removed and replaced at will, thus in no way inhibiting normal use of the device, whereas a light source permanently within the device would necessarily present breakage problems which would prevent the rough usage for which the devices are otherwise ideally suited. In addition, replacement of burned out bulbs and other maintenance problems practically rule out the employment of light sources within air-tight sealed structures unless such structures be quite complex and expensive.

Because of the substantial opacity of the structure walls, unusual display effects can be produced. For example, certain indicia could be placed on the exterior of the wall and other indicia on the interior thereof. The former indicia would be visible at all times, while the latter indicia would become visible only when the source of illumination was energized. Thus a changeable flashing illuminated device can be produced at extremely low cost.

The uses to which the device of the present invention may be put are so numerous that a complete catalog of them would be impossible. Apart from many advertising uses, the device could be employed during the day as a rough-and-tumble toy and during the night as a lawn display. A simulation of Santa Claus could be played with and could also serve as a striking and distinctive part of illuminated Christmas decorations either under the tree or in front of the house, and all that is necessary in order to convert the device from an illuminated one to a conventional one is to remove the source of illumination therefrom.

To the accomplishment of the above, and to such other objects as may hereinafter appear, the present invention relates to an illuminated display device as defined in the following claims and as described in this specification, taken together with the following drawings, in which:

Fig. 4 is a fragmentary rear elevational view of a portion of the structure where the light source is adapted to be mounted, but with the light source removed and with the means for supporting the light source spread apart;

Fig. 5 is a vertical cross sectional view of a typical embodiment of the present invention, showing a means different from that of Figs. 2–4 for supporting the light source and indicating the manner in which indicia may be printed on both the interior and exterior of the body wall;

Fig. 6 is a front elevational view, on a reduced scale, of the device of Fig. 5 when unilluminated; and Fig. 7 is a front elevational view of that device when illuminated.

Figures 1, 2:
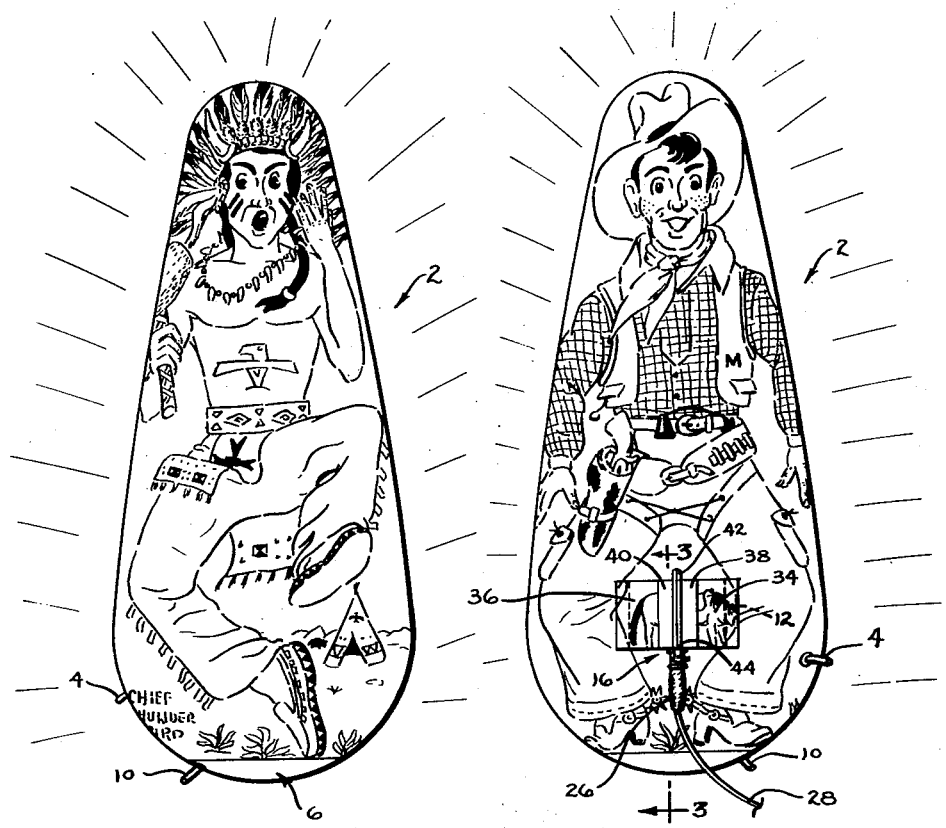
Fig. 1 is a front view of a typical embodiment of the present invention.
Fig. 2 is a rear view thereof with a source of illumination in place.

As here disclosed the display device takes the form of a substantially frusto-conical inflatable body generally designated 2 formed of some readily flexible sheet material such as vinyl resin the edges of which are sealed so as to define an air-tight hollow interior which may be filled with air through the valve 4. The shape may, of course, be varied widely. In order to make the device self-erecting its lower part, generally designated 6, is filled with some ballasting substance such as sand or water, the latter being held in place by means of a wall 8 (see Fig. 5) the edges of which are appropriately sealed to the inner surfaces of the body 2 adjacent the bottom thereof. The space 6 in which the ballasting material is received may be completely sealed, or, if desired, a valve 10 may be provided through which the ballasting material may be inserted or removed. The plastic sheet material of which the body 2 is formed is pigmented or otherwise treated so as to be substantially opaque, at least to a degree such that ordinary light will not pass therethrough to any appreciable degree. The material is nevertheless somewhat translucent, so that if the sheet is held in front of a bright light some light is visible therethrough. Under ordinary circumstances of use, however, the device, when inflated, does not exhibit any appreciable translucent properties. Representations of figures, designs, or messages are printed or otherwise formed on the exterior surfaces of the body 2, and if the walls of which the body is made were not substantially opaque insofar as normal illumination is concerned, a view of the device on one side would reveal the indicia on both sides, an obviously undesirable situation.

A portion of the material of which the body 2 is formed is, according to the present invention, removed from a limited area of the body to define an opening 12 and a sheet or layer of transparent or highly translucent material 14 covers the opening 12 and is secured to the body 2 along all of its edges so as to maintain the airtight nature of the interior of the device. The sheet 14 may take the form of a substantially clear sheet of flexible vinyl resin, which can then readily be heat-sealed to the body 2. The purpose of the sheet or panel 14 is to permit light from an external source of illumination generally designated 16 to pass readily therethrough into the interior of the device, the illumination source 16 being positioned on the exterior of the device.

Reference to Fig. 5 will disclose what takes place within the interior. Since the material of which the body 2 is formed is substantially opaque, only a small proportion of the light which impinges upon it at any given point is transmitted therethrough. A much greater proportion of that light is reflected therefrom, and the light which enters the interior of the body 2 therefore undergoes a multiplicity of reflections and re-reflections, bouncing off of the inner surfaces of the body walls, but losing a small portion of its intensity on each reflection because some light passes through the wall. The result is that the interior of the body 2 is substantially uniformly filled with light, and that light is caused to pass through the walls 2 with a substantially uniform intensity over the entire area thereof and substantially independently of the proximity of any given point to the place where the light source 16 may be positioned. It is significant and surprising that, as is shown in Fig. 1, there is no substantial difference between the degree of illumination of that area of the body wall 2 directly opposite the panel 14 and the light source 16 and any other area of the body 2. The device thus lights up so as not only to give the appearance of being illuminated from the interior, which it is only in a manner of speaking, the actual light source being on the exterior of the device, but also to give the impression that the source of illumination is uniformly distributed throughout the interior.

A very striking effect can be obtained if certain indicia, designated by the numeral 18 (see Figs. 5–7), are imprinted on the outside of the body wall 2, and if other indicia designated by the numeral 20 are imprinted on the interior thereof. When the source of illumination 16 is not present or is de-energized only the indicia 18 will be visible, as in Fig. 6, the indicia 20 being invisible because of the substantial opacity of the walls of the body 2. However, when the light source 16 is in place and energized, the indicia 20 will cast a shadow which will be readily visible, as in Fig. 7, thus adapting the device for use as a flashing sign or display.

In the form here specifically disclosed, where the panel 14 and even the walls of the body 2 are formed of thermoplastic vinyl sheeting, which is sensitive to heat, it is important that the illumination source 16, particularly when it takes the form of an incandescent bulb 22 which emanates considerable heat when energized, should be spaced from the panel 14 with which it is in registration. To this end, as may best be seen in Figs. 3 and 5, the light source 16 may take a form similar to that of a conventional "trouble lamp" used by automobile repairmen and the like. The bulb 22 is mounted in a socket 24 to which a handle 26 is attached, a wire 28 being connected to the socket 24 and leading to any suitable external power source. A reflector 30 surrounds the rear part of the bulb 22, so that substantially all of its illumination will be directed through the panel 14 into the interior of the body 2. A wire cage 32 is spaced from the front face of the bulb 22, the cage 32 rather than the bulb 22 engaging the panel 14 when the light source 16 is in position. Hence a passage is opened between the bulb 22 and the vinyl sheets 2 and 14, through which passage air may circulate so as to carry off the heat generated by the bulb 22 and prevent deterioration of the plastic sheets.

Figure 3:
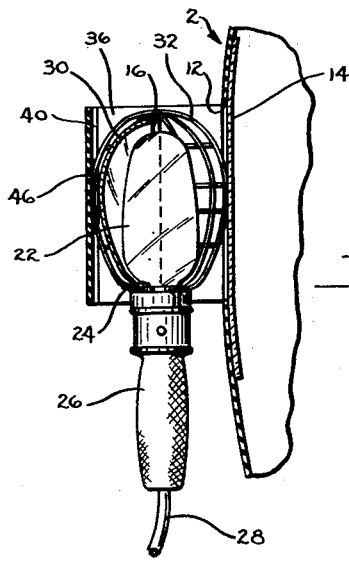
Fig. 3 is a cross sectional view on an enlarged scale taken along the line 3—3 of Fig. 2.

Any appropriate means may be provided for holding the light source 16 in position in substantial registration with the panel 14. In the form disclosed in Figs. 2–4, a pair of vinyl sheet segments 34 and 36 are employed, secured at their outer edges to the body of the wall 2 on either side of the opening 12, as by heat sealing, and extending in a slack manner across the opening 12 so as, in conjunction with the panel 14 of the wall of the body 2, to define a sleeve into which the light source 16 is frictionally received. The segments 34 and 36 may be the very material removed from the wall of the body 2 in order to define the opening 12, widened by the stringers 38 and 40 of some separable securing means, such as a plastic slide fastener 42 having a slider 44. When the slide fastener 42 is opened the segments 34 and 36 may be spread apart, as shown in Fig. 4, so as to permit the light source 16 to be positioned or removed, and when the slide fastener 42 is closed while the light source 16 is in place, the light source 16 will be frictionally retained in position, as shown in Fig. 3. Since the reflector 36 of the particular light source 16 shown in Fig. 3 might well become quite warm after prolonged energization of the bulb 22, it is advantageous to extend the cage 32 to the rear and spaced from the reflector 30, as indicated by the reference numeral 46, so as to provide a passage for air circulation between the reflector 30 and that portion of the light source supporting means which would otherwise come in contact therewith.

It will be understood that any other mode of attachment of the light source 16 to or in operative relationship with the body 2 may be utilized. For example, in Fig. 5 a loop 48 is provided on the exterior of the wall of the body 2 above the opening 12, with which a hook 50 on the light source 16 is adapted to engage.

When the illuminated device is of the self-erecting type here specifically disclosed, it is advantageous that the panel 14 and the light source 16 be positioned close to the bottom thereof in order to exert as little force as possible tending to tip or tilt the body 2. The greater the distance of the light source 16 from the center of gravity of the body 2, the greater will be the magnitude of the tilting moment exerted by the weight of the light source 16. When the light source 16 and panel 14 are positioned as shown in the drawings, only a minimum tilting effect is produced, and even this, if unacceptable, can readily be compensated for by employing any appropriate prop between the floor on which the device rests and the rear portion of the body 2 on which the light source is supported.

When the light source 16 is not in place the device may be used in conventional manner. Only a small area of the surface thereof will be at all modified from its usual structure and appearance, either by exhibiting the panel 14 or by exhibiting the slack segments 34 or 36. This is no real impediment to the use of the device, particularly when the panel 14 and the segments 34 and 36 are made of flexible plastic sheet material comparable to or substantially identical with the material of which the remainder of the body 2 is formed. The illumination source 16 may be placed in position in registration with the panel 14 whenever desired in order to convert the device into an illuminated one and, as has previously been brought out in some detail, the resultant effect is as though the device were not only illuminated from the inside, but illuminated from a source of appreciable area substantially coextensive with the area of the device rather than from what is substantially a point source. Thus by the present invention I have materially extended the uses to which devices of this nature can be put without detracting from their previous uses and without adding in any appreciable degree to the cost or complexity of manufacture thereof.

While but a limited number of specific embodiments are here disclosed, it will be apparent that many variations may be made therein, all within the scope of the following claims.

I claim:

1. An illuminated display device comprising an inflated hollow body of flexible sheet material having a translucent characteristic such that only bright light is visible therethrough, said body including a panel of material on a side thereof having the characteristic of passing light more readily than the remainder of said body, and means on said body side for supporting a source of illumination on the exterior of said body side and in registration with said panel, said supporting means comprising a slack layer of flexible sheet material secured to the exterior of said body side in the vicinity of said panel and defining, with said body side, a sleeve open at top and bottom into which said source of illumination is adapted to be received and retained.

2. The display device of claim 1, in which said body side is formed of plastic sheet material cut away over an area thereof, said panel comprising a sheet of compatible plastic sheet material covering said cutaway area and secured to said body side around the edges thereof.

3. The illuminated display device of claim 2, in which said layer comprises two segments each secured to said body side and connected to one another by a separable securing means.

4. The illuminated display device of claim 1, in which said layer comprises two segments each secured to said body side and connected to one another by a separable securing means.

References Cited in the file of this patent

UNITED STATES PATENTS

| | | |
|---|---|---|
| 1,843,841 | Ryerson | Feb. 2, 1932 |
| 1,948,295 | Haines et al. | Feb. 20, 1934 |
| 2,107,641 | Malcomson | Feb. 8, 1938 |
| 2,170,641 | Lancelot | Aug. 22, 1939 |
| 2,400,626 | Brede | May 21, 1946 |
| 2,449,935 | Gilman | Sept. 21, 1948 |
| 2,557,383 | Kerwer | June 19, 1951 |

FOREIGN PATENTS

| | | |
|---|---|---|
| 10,295 | Great Britain | Dec. 8, 1897 |
| 529,271 | Great Britain | Nov. 18, 1940 |